United States Patent
Sauder et al.

(10) Patent No.: US 10,309,427 B2
(45) Date of Patent: *Jun. 4, 2019

(54) VARIABLE PRESSURE CONTROL SYSTEM FOR DUAL ACTING ACTUATORS

(71) Applicant: Precision Planting LLC, Tremont, IL (US)

(72) Inventors: Derek A. Sauder, Tremont, IL (US); Jeremy J. Hodel, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,692

(22) Filed: Sep. 1, 2017

(65) Prior Publication Data
US 2017/0363113 A1 Dec. 21, 2017

Related U.S. Application Data

(63) Continuation of application No. 15/049,168, filed on Feb. 22, 2016, now Pat. No. 9,752,596, which is a
(Continued)

(51) Int. Cl.
| | |
|---|---|
| *F15B 11/04* | (2006.01) |
| *A01B 63/00* | (2006.01) |
| *F15B 11/042* | (2006.01) |

(52) U.S. Cl.
CPC .......... *F15B 11/042* (2013.01); *A01B 63/008* (2013.01); *F15B 2211/3057* (2013.01);
(Continued)

(58) Field of Classification Search
CPC ......... F15B 11/042; F15B 11/04; F15B 11/00; F15B 2211/3057; F15B 2211/30565; F15B 2211/3056; F15B 2211/305; F15B 2211/30; F15B 2211/00; F15B 2211/50554; F15B 2211/505; F15B 2211/50; F15B 2211/7053; F15B 2211/7051; F15B 2211/705; F15B 2211/70; A01B 63/008; A01B 63/002; A01B 63/00
(Continued)

(56) References Cited

U.S. PATENT DOCUMENTS

| | | | |
|---|---|---|---|
| 2,570,862 | A | 6/1956 | Garmager |
| 2,782,703 | A | 2/1957 | Chambers et al. |

(Continued)

FOREIGN PATENT DOCUMENTS

| | | |
|---|---|---|
| CA | 2144564 | 6/2004 |
| EP | 0372901 B1 | 2/1994 |

OTHER PUBLICATIONS

IMI Norgren Limited; "Clean Compressed Air: The Norgren guide to effective air preparation"; p. 11.
(Continued)

*Primary Examiner* — Christopher J. Novosad
(74) *Attorney, Agent, or Firm* — Thomas J. Oppold; Larkin Hoffman Daly & Lindgren, Ltd.

(57) ABSTRACT

A variable pressure control system for varying pressures in the fluid circuits of a dual acting actuator over a range of pressures. The variable pressure control system includes a controller that cooperates with pressure regulators for regulating the desired pressure in the fluid circuits.

14 Claims, 12 Drawing Sheets

Related U.S. Application Data continuation of application No. 14/047,465, filed on Oct. 7, 2013, now Pat. No. 9,301,438, which is a continuation of application No. 12/970,708, filed on Dec. 16, 2010, now Pat. No. 8,550,020.

(52) U.S. Cl.
CPC ............... *F15B 2211/50554* (2013.01); *F15B 2211/7053* (2013.01)

(58) Field of Classification Search
USPC .... 111/926, 900, 200, 190–195; 172/2, 315, 172/316, 263, 664; 60/459–468, 325; 701/50, 1
See application file for complete search history.

(56) References Cited

U.S. PATENT DOCUMENTS

| | | | |
|---|---|---|---|
| 3,213,621 A | 10/1965 | Swift et al. | |
| 4,110,983 A | 9/1978 | Sherman | |
| 4,183,468 A | 1/1980 | Van Der Lely et al. | |
| 4,193,458 A | 3/1980 | Meinert et al. | |
| 4,452,481 A | 6/1984 | Williams | |
| 4,537,221 A | 8/1985 | Weirich et al. | |
| 4,648,466 A | 3/1987 | Baker et al. | |
| 4,813,435 A | 3/1989 | Arms | |
| 4,817,730 A | 4/1989 | Winter | |
| 4,883,127 A | 11/1989 | Chevrier | |
| 4,913,070 A | 4/1990 | Morrison, Jr. | |
| 5,129,282 A | 7/1992 | Bassett et al. | |
| 5,156,065 A | 10/1992 | Fujimoto et al. | |
| 5,341,754 A | 8/1994 | Winterton | |
| 5,461,995 A | 10/1995 | Winterton | |
| 5,479,992 A | 1/1996 | Bassett | |
| 5,499,683 A | 3/1996 | Bassett | |
| 5,562,165 A * | 10/1996 | Janelle | A01B 63/11 172/4 |
| 5,878,678 A | 3/1999 | Stephens et al. | |
| 5,970,892 A | 10/1999 | Wendling et al. | |
| 6,134,814 A | 10/2000 | Christy et al. | |
| 6,135,037 A | 10/2000 | Juptner | |
| 6,163,985 A | 10/2000 | Chinnery et al. | |
| 6,223,663 B1 | 5/2001 | Wendling et al. | |
| 6,253,692 B1 | 7/2001 | Wendling et al. | |
| 6,330,922 B1 | 12/2001 | King | |
| 6,389,999 B1 | 5/2002 | Duello | |
| 6,701,857 B1 | 3/2004 | Jensen et al. | |
| 7,073,314 B2 | 7/2006 | Beck et al. | |
| 7,222,575 B2 | 5/2007 | Bassett | |
| 7,507,917 B2 | 3/2009 | Kaltenheuser | |
| 7,673,570 B1 | 3/2010 | Bassett | |
| 7,832,345 B2 | 11/2010 | Whalen et al. | |
| 7,861,660 B2 | 1/2011 | Martin | |
| 8,550,020 B2 * | 10/2013 | Sauder | F15B 11/042 111/200 |
| 9,301,438 B2 * | 4/2016 | Sauder | F15B 11/042 |
| 9,752,596 B2 * | 9/2017 | Sauder | F15B 11/042 |
| 2010/0275827 A1 | 11/2010 | Van Buskirk et al. | |

OTHER PUBLICATIONS

Yetter Farm Equipment; "Titan Series 2960 U.N.T. Coulter 2967-007 U.N.T. Residue Manager Operator's Manual"; pp. 1-28.
Dawn Equipment Company Inc.; "Dawn Model 5010 GroundFX Row Cleaner Assembly and Operation Manual"; pp. 1-22.

\* cited by examiner

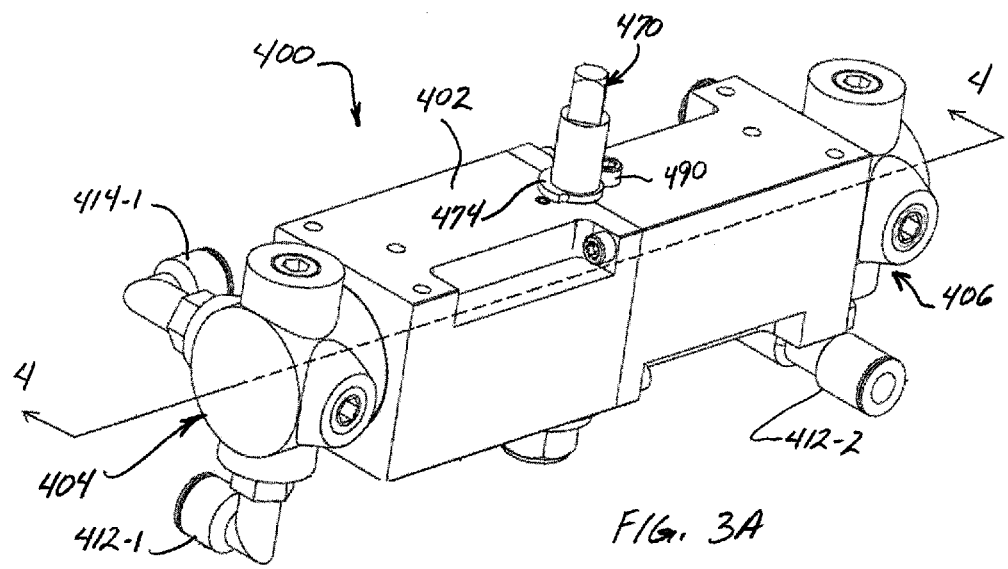
FIG. 3A
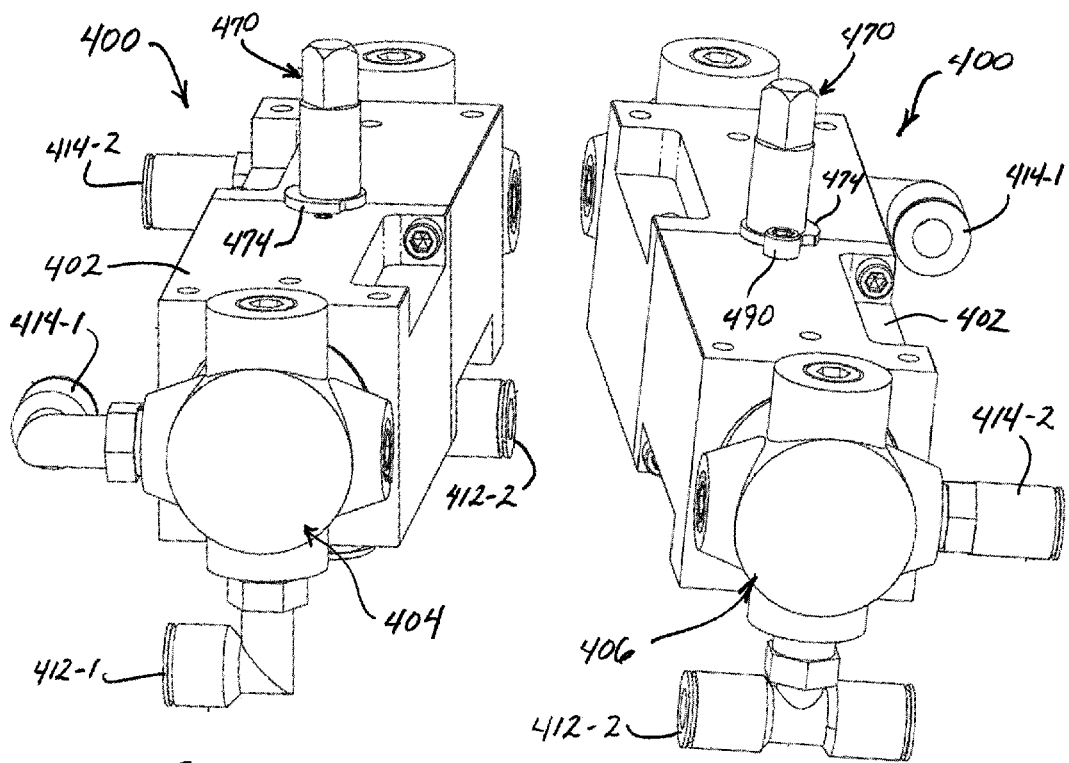
FIG. 3B
FIG. 3C

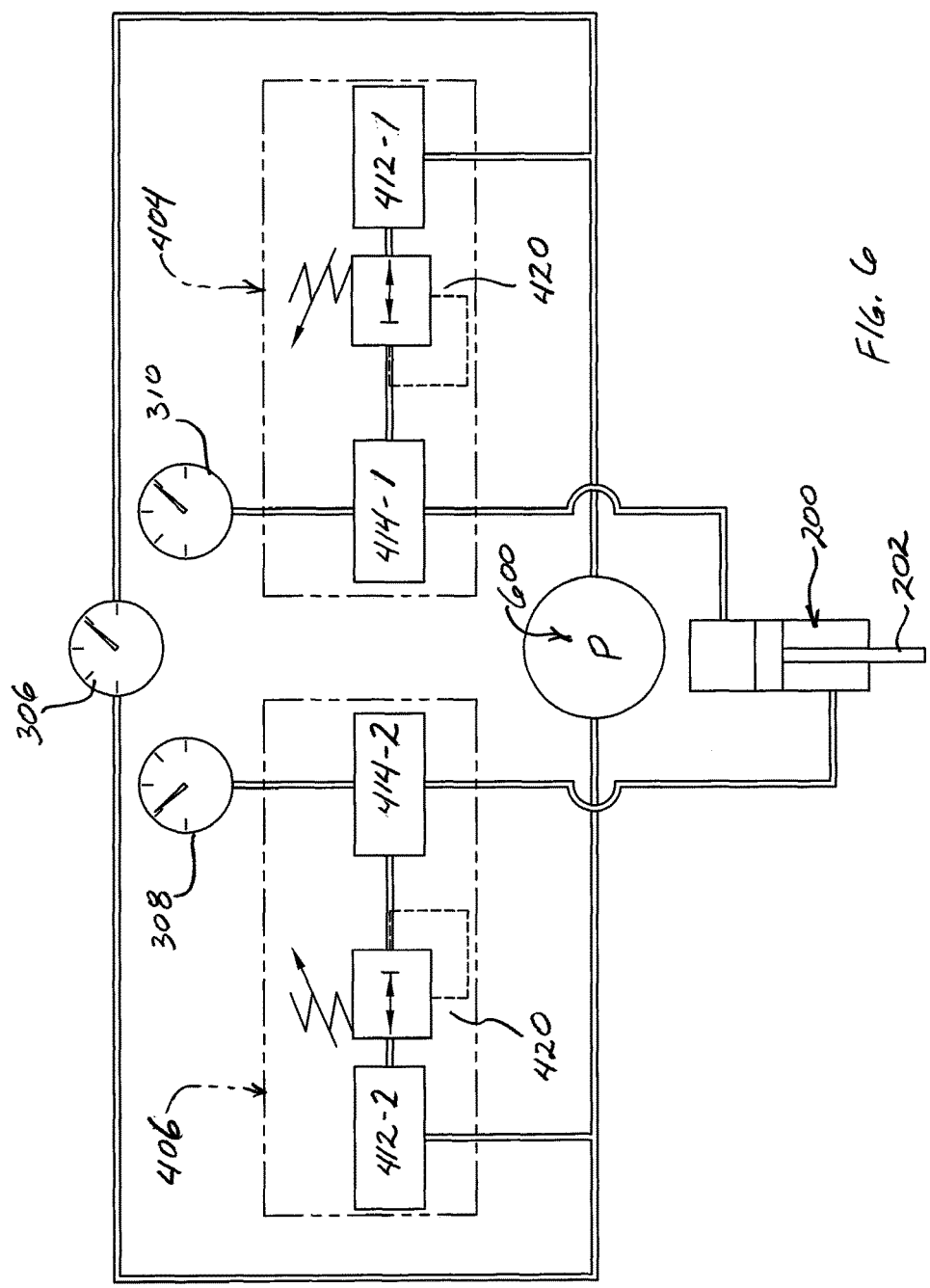

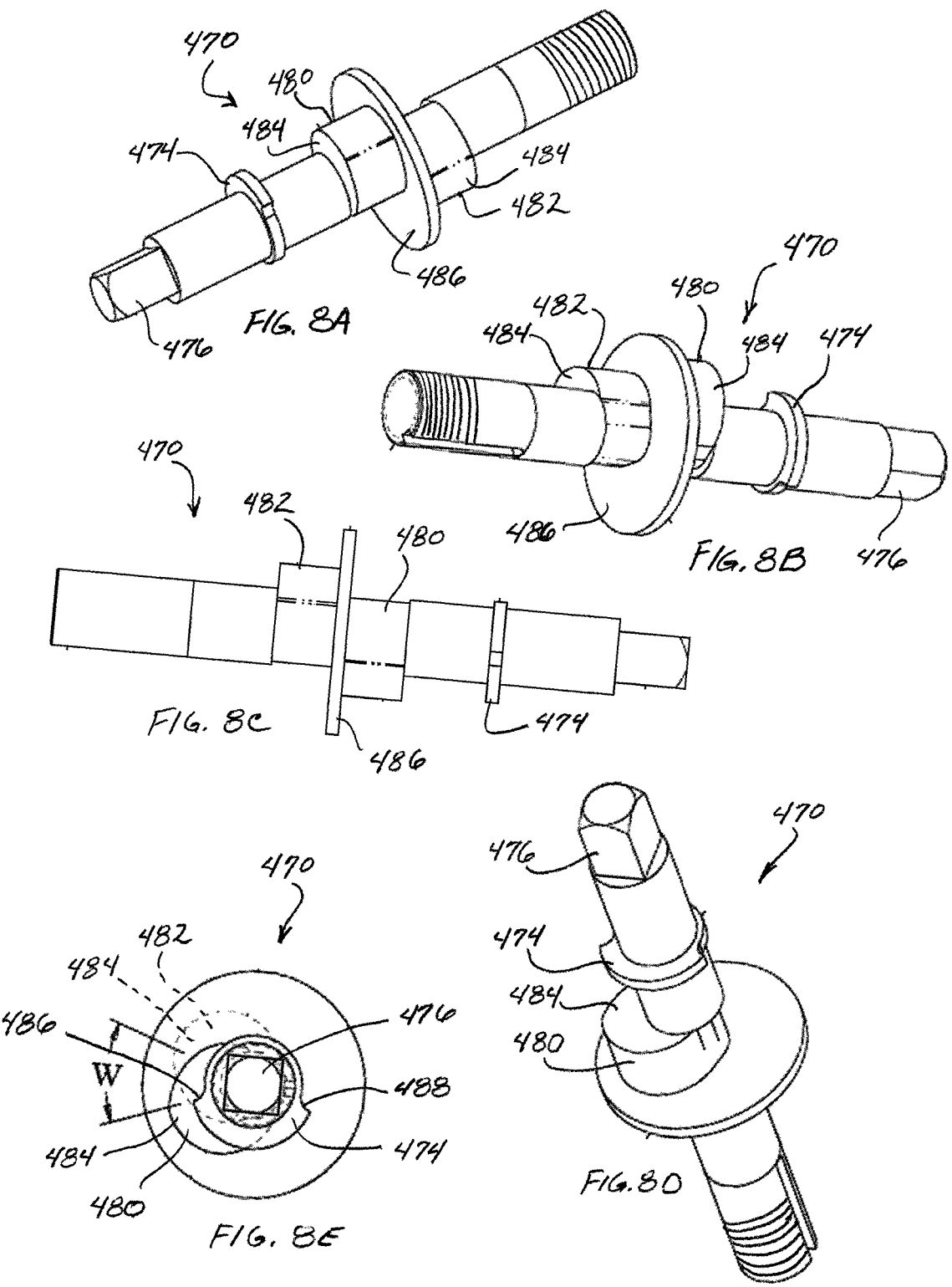

VARIABLE PRESSURE CONTROL SYSTEM FOR DUAL ACTING ACTUATORS

CROSS-REFERENCE TO RELATED APPLICATIONS

This is a continuation of U.S. application Ser. No. 15/049168, filed Feb. 22, 2016; which is a continuation of U.S. application Ser. No. 14/047,465, filed Oct. 7, 2013, now U.S. Pat. No. 9,301,438; which is a continuation of U.S. application Ser. No. 12/970,708, filed Dec. 16, 2010, now U.S. Pat. No. 8,550,020.

BACKGROUND

Most control systems for dual acting hydraulic or pneumatic cylinders or actuators utilize a directional control valve for controlling the flow of fluid under a constant or predefined pressure to force the actuator rod to extend or retract. In some applications, it would be desirable to not only control the direction of the fluid flow for actuating an actuator, but also to vary or regulate the fluid pressure in the fluid circuits for actuating the actuators.

One application in particular where it would be desirable to control the actuators as well as regulate or vary the fluid pressure in the fluid circuits is in connection with row cleaners on an agricultural planter. Row cleaners, such as disclosed in U.S. Pat. No. 7,673,570 ("the '570 patent"), incorporated herein in its entirety by reference, are used to clear away crop residue, soil clods and other debris that can interfere with proper furrow formation and seed growth. When planting fields with heavy crop residue, it may be desirable to exert extra downforce on the row cleaner to ensure a more aggressive action of the row cleaner to clear away the heavy crop residue. In field conditions where the crop residue is light, a less aggressive action of the row cleaner may be desired. To increase or decrease the aggressiveness of the row cleaner while on-the-go during planting operations, a hydraulic or pneumatic cylinder is typically employed to raise and lower the row cleaner. In conventional control systems for raising and lowering row cleaners equipped with a hydraulic or pneumatic actuators, the operator's only control over the row cleaners is through movement of a lever fore or aft to open and close a directional control valve in the fluid circuit thereby causing the row cleaner actuator to extend or retract to respectively lower or raise the row cleaner. Accordingly, as the planter traverses the field, the operator is required to continually look back at the row cleaners and adjust their height up or down to maintain the desired amount of aggressiveness as the soil conditions, terrain and amount of crop residue vary.

The control system disclosed in the '570 patent allows the operator to set a desired downpressure for the row cleaner which is then automatically maintained as the planter traverses the field. The '570 patent also allows the operator to change the pressure of the hydraulic fluid supplied to the cylinders. However, the pressure in the fluid circuits is controlled through an electronic control system in combination with an accumulator having a hydraulic fluid chamber and a pressurized gas chamber. Thus, while the control system of the '570 patent may serve its intended purpose it is a complex system with a higher associated cost.

It is desirable, therefore, to provide a control system which allows an operator to set a desired pressure in the fluid circuits so that as soil conditions and terrain vary during planting operations as the planter traverses the field, the actuator will self adjust to maintain the desired preset pressure in the fluid circuits. By maintaining the desired preset pressure in the fluid circuits, the row cleaner will follow the terrain or contours of the field while maintaining the desired amount of aggressiveness of the row cleaner. Furthermore, it would be desirable for such a control system to be relatively low in cost and simple to install and which is simple and intuitive to operate without the need for electronics and microprocessors.

Such a control system may have applications to other ground engaging devices on agricultural equipment or wherever there is a need for a low cost, simple and intuitive control system for providing directional control of hydraulic or pneumatic actuators over a range of variable pressures.

BRIEF DESCRIPTION OF THE DRAWINGS

FIG. 3A is a perspective view of a preferred embodiment of a regulator assembly for the control system of FIG. 1.

FIG. 3B is another perspective view of the regulator assembly of FIG. 3A.

FIG. 3C is another perspective view of the regulator assembly of FIG. 3A.

FIG. 6 is a schematic illustration of the first and second fluid circuits of the control system of FIG. 1.

FIG. 8A is a perspective view of a preferred embodiment of a cam shaft for the regulator assembly of FIG. 3A.

FIG. 8B is another perspective view of the cam shaft of FIG. 8A.

FIG. 8C is a side elevation view of the cam shaft of FIG. 8A.

FIG. 8D is another perspective view of the cam shaft of FIG. 8A.

FIG. 8E is an end elevation view the cam shaft of FIG. 8A.

DESCRIPTION

Figure 1:
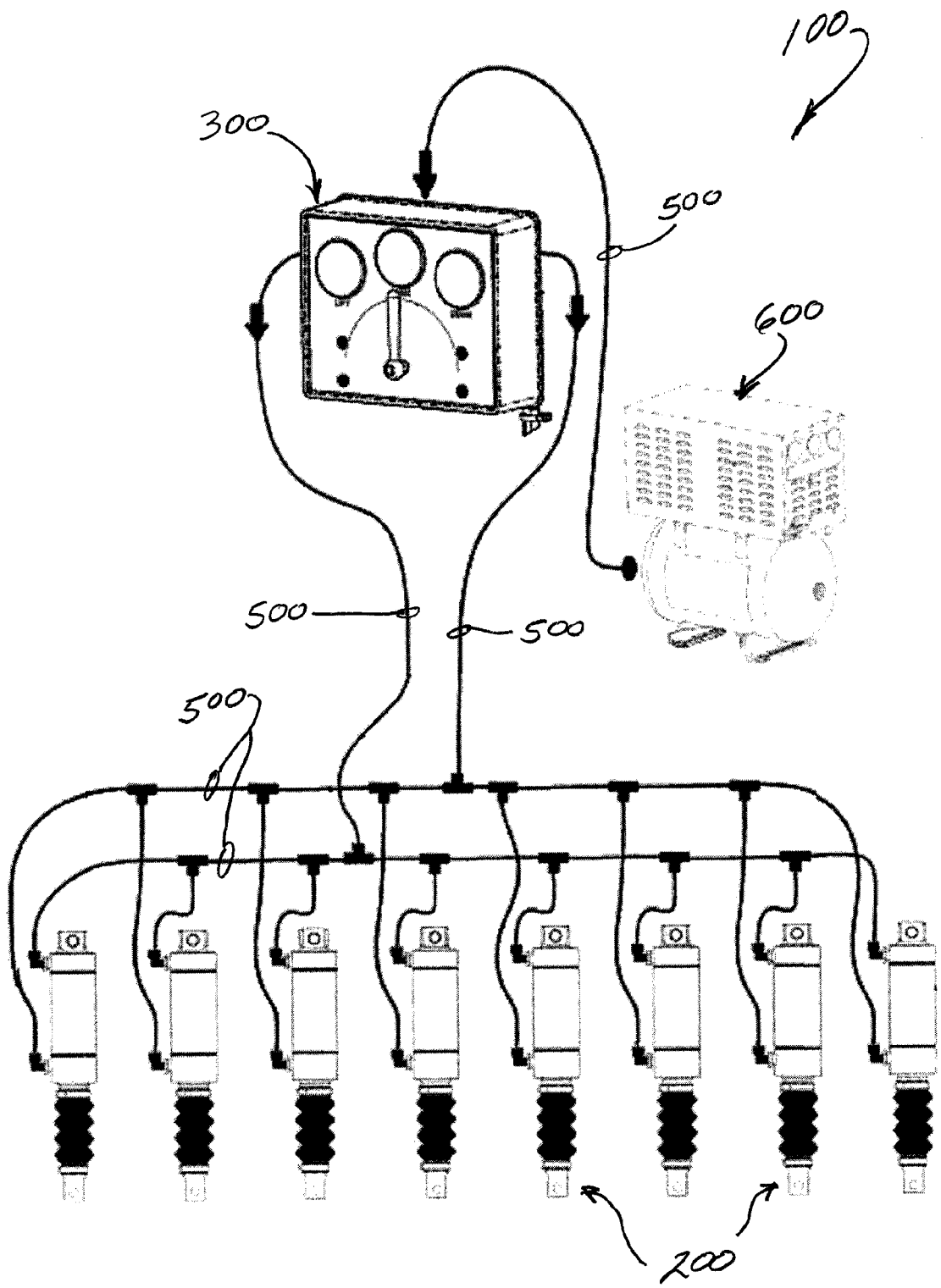
FIG. 1 is a schematic illustration of a preferred embodiment of a control system for controlling fluid flow for actuation of one or more dual acting actuators.

Referring now to the drawings, wherein like reference numerals designate identical or corresponding parts throughout the several views, FIG. 1 schematically illustrates a control system 100 for controlling actuation of one or more dual acting actuators 200, such as pneumatic or hydraulic cylinders. The control system 100 includes a controller 300 and a pressure source 600, which provides a substantially constant pressure to the controller 300. Conduits 500 fluidly connect the pressure source 600, the controller 300 and the actuators 200. The controller 300 incorporates a pressure regulator assembly 400 which permits the operator to vary or regulate the pressure applied to actuate the actuators 200.

As discussed later, the control system 100 is particularly adapted for use with an agricultural planter 10 (FIG. 10) for controlling row cleaners 12 or other soil engaging members. However, those skilled in the art will appreciate that the control system 100 may have other equally suitable uses wherever it is desirable to provide a simple and intuitive means for directional control of hydraulic or pneumatic actuators over a range of variable fluid pressures.

It should also be appreciated that although the preferred embodiment of the control system 100 as described herein is a pneumatic system, those skilled in the art would understand the control system 100 could be adapted to a hydraulic system. Accordingly, the term "fluid" should be understood to include or refer to any fluid medium, including air, hydraulic oil or any other suitable fluid. Additionally, although the term "air" may be used when referring to the fluid used in the preferred embodiment or when describing a feature of the preferred embodiment, it should be understood that if the system 100 is adapted to a hydraulic system, any reference to air flow would of course be replaced with hydraulic oil or other fluid medium.

Figure 2A:
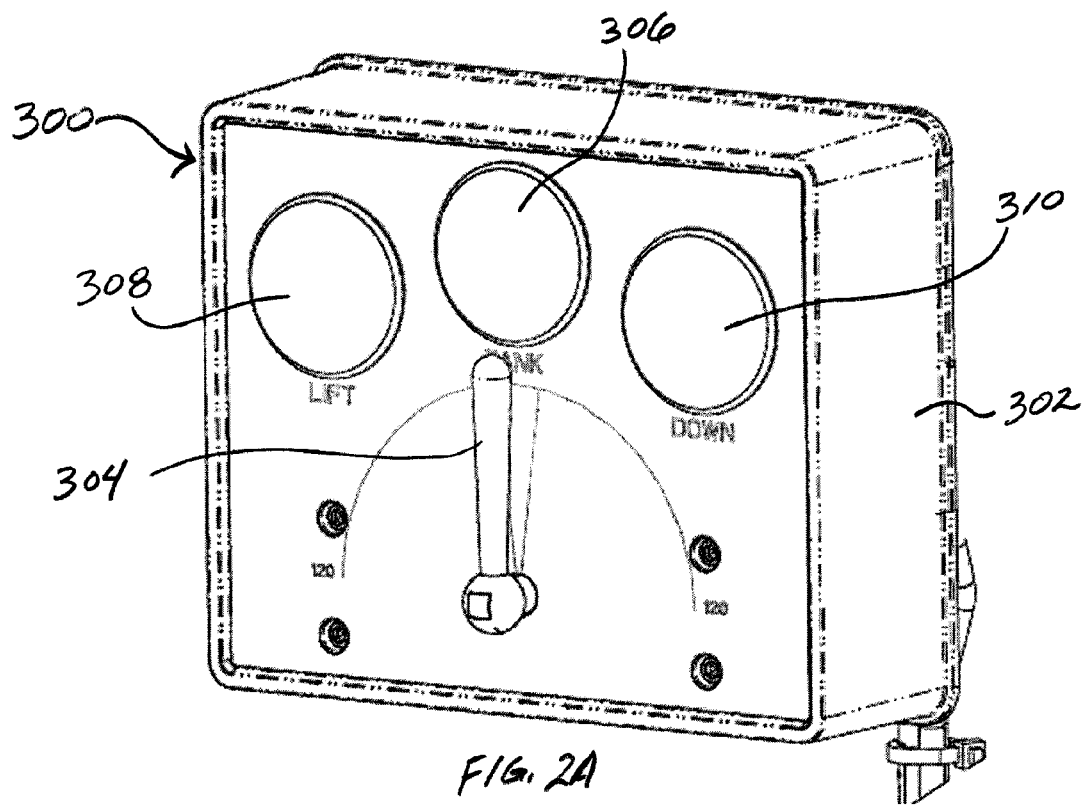
FIG. 2A is a front perspective view of a preferred embodiment of a controller for the control system of FIG. 1.
Figure 2B:
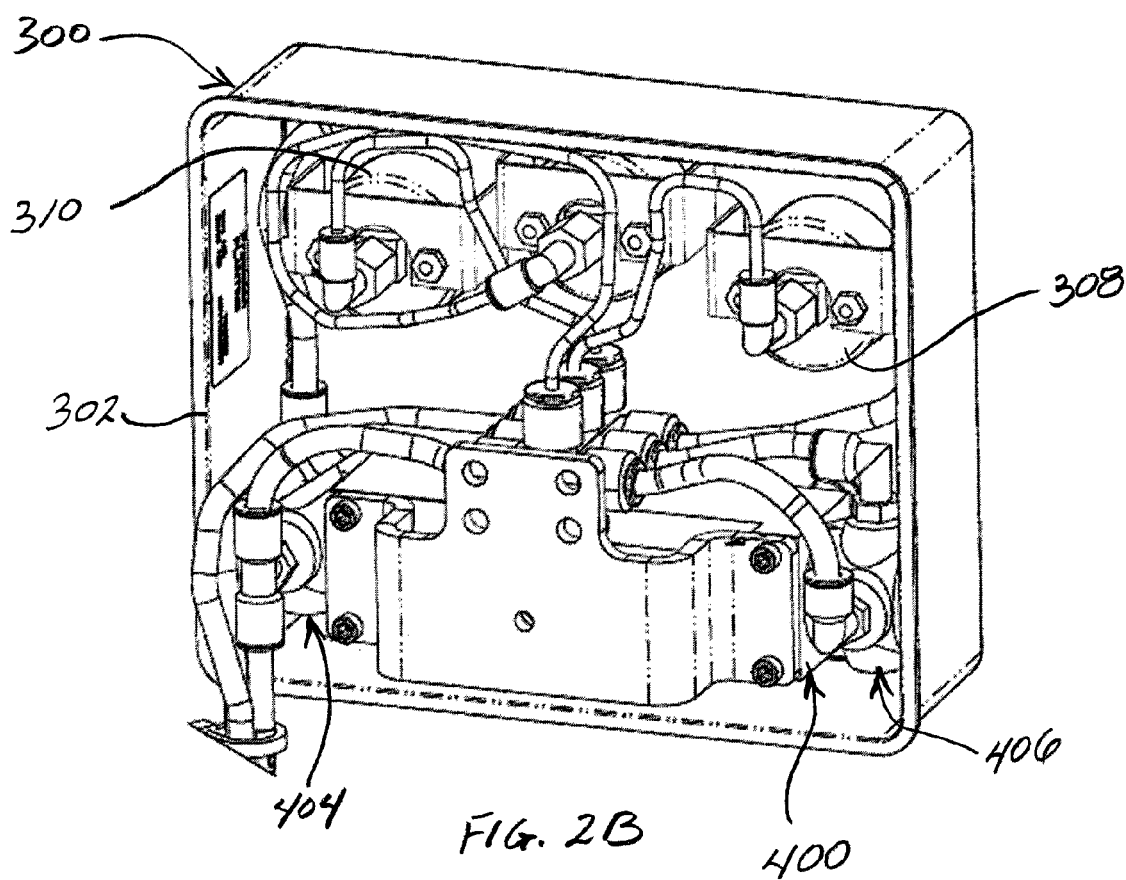
FIG. 2B is a rear perspective view of the controller of FIG. 2A.

Referring to FIGS. 2A and 2B, the controller 300 includes a pressure regulator assembly 400 (FIG. 2B). The pressure regulator assembly 400 is housed within the housing 302 of the controller. A user interface 304 is provided for interfacing with the pressure regulator assembly 400 and is preferably configured to be easily grasped by the hand of an operator such as a lever, a dial or the like. The controller 300 also preferably includes visual indicators that display the source pressure 306, the lift pressure 308 and the down pressure 310. The down pressure 310 is the amount of pressure on the side of the fluid circuit for extending the actuator ram 202 (hereinafter the "down circuit"). The lift pressure 308 is the amount of pressure on the side of the circuit for retracting the actuator ram 202 (hereinafter the "lift circuit"). The visual indicators 306, 308, 310 may be analog gauges or digital displays, or any other desired visual indicator of pressure in the respective fluid circuits.

Figure 9:
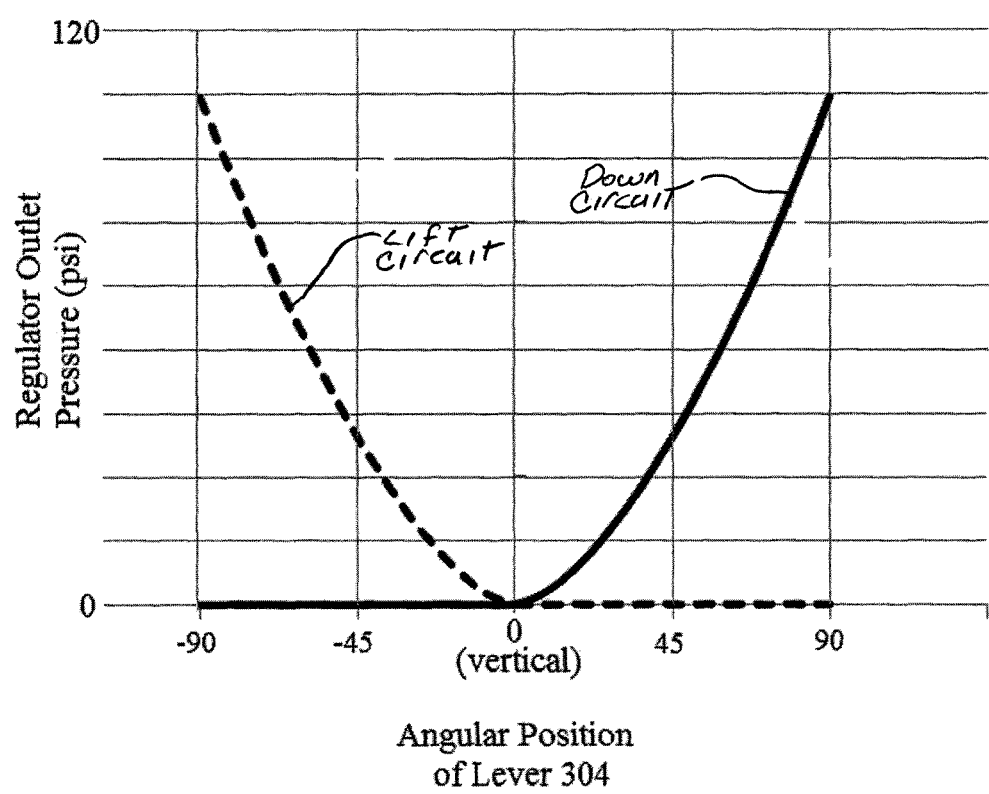
FIG. 9 graphically illustrates the relationship of the fluid pressures in the down circuit and lift circuit versus the angular position of the user interface of the controller of FIG. 2A.

By moving the user interface 304 (hereinafter the "lever 304"), the operator is preferably able to set the desired amount of fluid pressure in the down circuit and lift circuit by rotating the lever 304 clockwise or counter-clockwise as viewed in FIG. 2A. The further the operator rotates the lever 304 counterclockwise or in the direction labeled "LIFT", the greater the pressure in the lift circuit. Likewise, the further the operator rotates the lever 304 clockwise or in the direction labeled "DOWN," the greater the pressure in the down circuit. As depicted in the embodiment of the controller 300 of FIG. 2A, the pressure in the down circuits and lift circuits is variable over a range from 0 psi when the lever 304 is in the vertical position to 120 psi when the handle is rotated 90 degrees counterclockwise or 90 degrees clockwise. FIG. 9 graphically illustrates how the pressure increases depending on the angular position of the lever 304 in either direction from the vertical neutral position at which point the pressure is zero and/or substantially equal or constant in both the down circuits and lift circuits. Of course, it should be appreciated that the pressure ranges, the user interface 304, the visual indicators 306, 308, 310 and other features of the controller 300 described above may be altered or varied depending on preferences and the particular application of the control system 100. As such, the controller 300 should not be construed as being limited to the particular embodiment described and illustrated herein.

Figure 4:
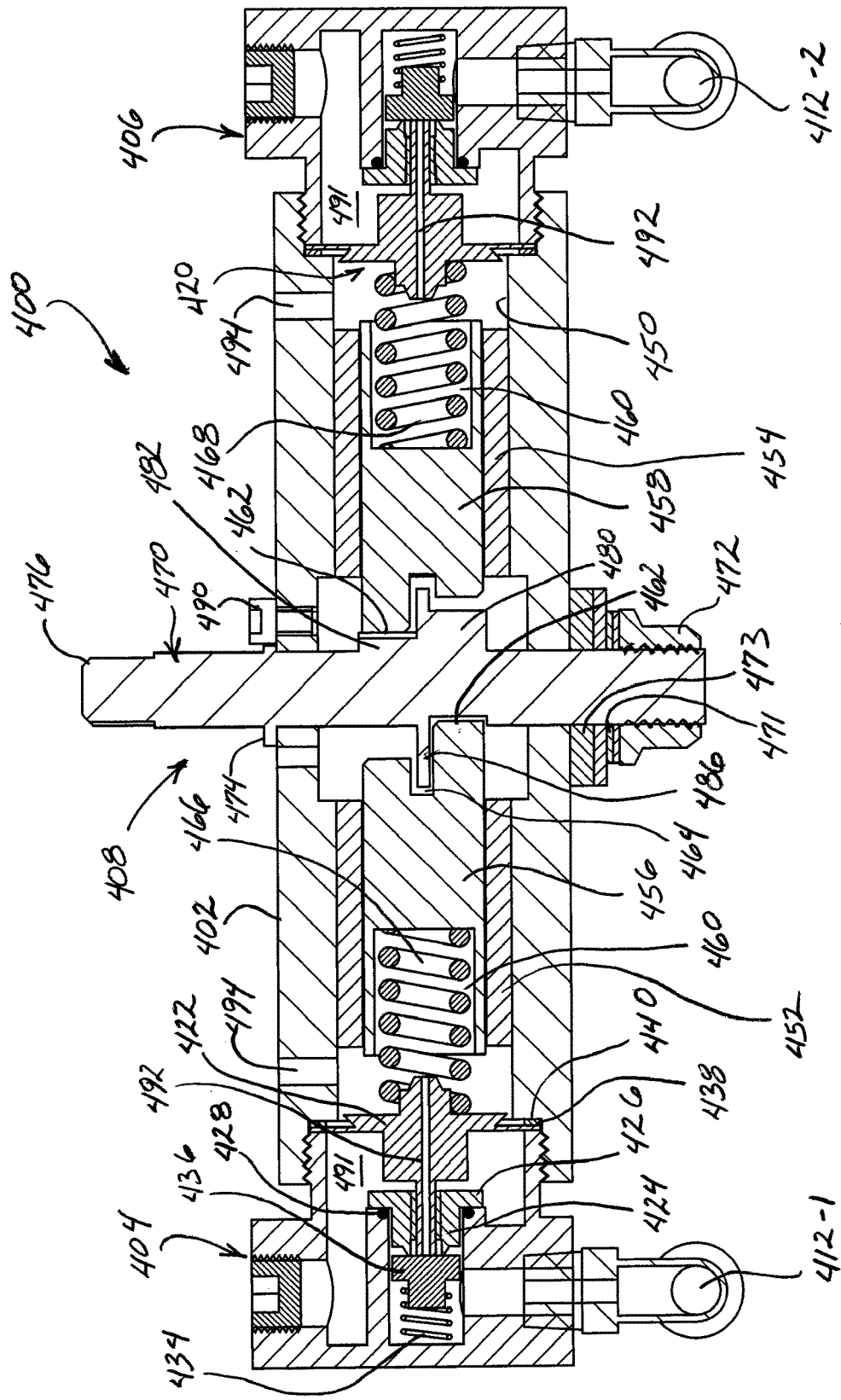
FIG. 4 is a cross-sectional view of the regulator assembly as viewed along lines 4-4 of FIG. 3A.

A preferred embodiment of the pressure regulator assembly 400 is illustrated in FIGS. 3A-3C. FIG. 4 shows a cross-section of the preferred assembly 400 as viewed along lines 4-4 of FIG. 3A. The pressure regulator assembly 400 includes a main body 402, a first regulator 404, a second regulator 406 and a regulator biasing mechanism 408. The regulator biasing mechanism 408 is moveable within the main body 402 and cooperates with the first and second regulators 404, 406 for controlling the flow of air or other fluid therethrough as described in detail later. The regulator biasing mechanism 408 is operably connected to the user interface 304, via a camshaft 470 (discussed later) such that movement of the user interface 304 results in a corresponding movement of the regulator biasing mechanism 408 within the main body 402.

Figure 5:
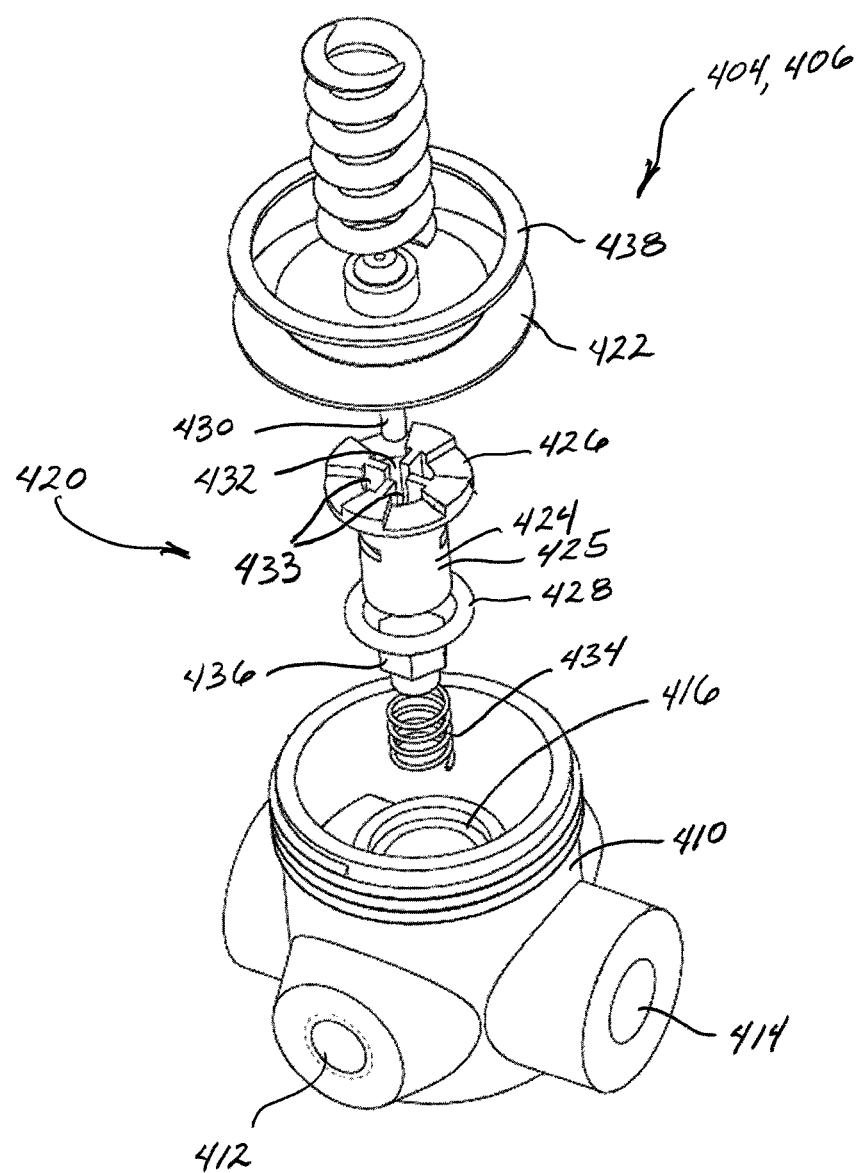
FIG. 5 is an exploded perspective view of a pressure regulating valve for the control system of FIG. 1.

FIG. 5 is an exploded perspective view of the preferred first and second regulators 404, 406. The first and second regulators 404, 406 are preferably ported regulators such as those manufactured by Norgren, Inc., model no. R07-100-RNLA, although other regulators having different configurations may be equally suitable. Each of the regulators 404, 406 comprises a regulator housing 410 defining an inlet port 412, an outlet port 414 and a valve seat 416. The inlet and outlet ports 412, 414 are preferably disposed at 90 degree angles from one another. A pressure regulating valve 420 is positioned within the valve seat 416 to control air flow from the inlet port 412 to the outlet port 414. For clarity the inlet and outlet ports of the first regulator 404 are hereinafter referred to using reference characters 412-1 and 414-1, respectively. Likewise, the inlet and outlet ports of the second regulator 406 are hereinafter referred to using reference characters 412-2 and 414-2, respectively.

FIG. 6 schematically illustrates the preferred lift circuits and down circuits of the control system 100 for controlling the dual acting actuator 200. The pressure supply 600 is in fluid communication with the tank pressure visual indicator 306 and the fluid inlet ports 412 of both the first and second regulators 404, 406. The pressure regulating valve 420 regulates the fluid flow based on the position of the regulator biasing mechanism 408 controlled by the lever 304. The first regulator outlet port 414-1 is in fluid communication with the lift circuit and visual indicator 308. The second regulator outlet port 414-2 is in fluid communication with the down circuit and visual indicator 310.

Referring again to FIG. 4 in conjunction with FIG. 5, the pressure regulating valve 420 of the first and second regulators 404, 406 includes a diaphragm 422 and a valve body 424. The valve body 424 has a cylindrical shaft 425, an outer flange 426, an axial opening 432 and axial fluid passageways 433. The cylindrical shaft 425 of the valve body 426 is received within an o-ring 428. The o-ring 428 is seated in the end of the valve seat 416. The outer flange 426 rests on top of the o-ring 428. The diaphragm stem 430 extends through the axial opening 432 in the valve body 424. The valve spring 434 is received within the valve seat 416 and biases the plug 436 against the bottom end of the valve body 424.

The regulators 404, 406 are preferably coaxially mounted to the ends of the main body 402 by a threaded connection. As the regulators are threaded into the ends of the main body 402, a slip ring 438 and the peripheral edge of the diaphragm 422 are sandwiched between the end of the regulator housing 410 and an inside lip 440 of the main body 402 thereby creating a fluid tight seal.

Figure 7A:
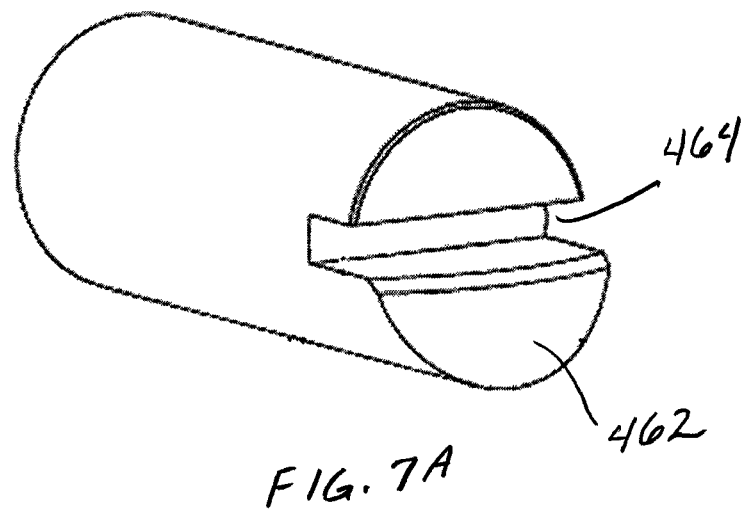
FIG. 7A is a perspective view of a preferred embodiment of a piston for the regulator assembly of FIG. 3A.
Figure 7B:
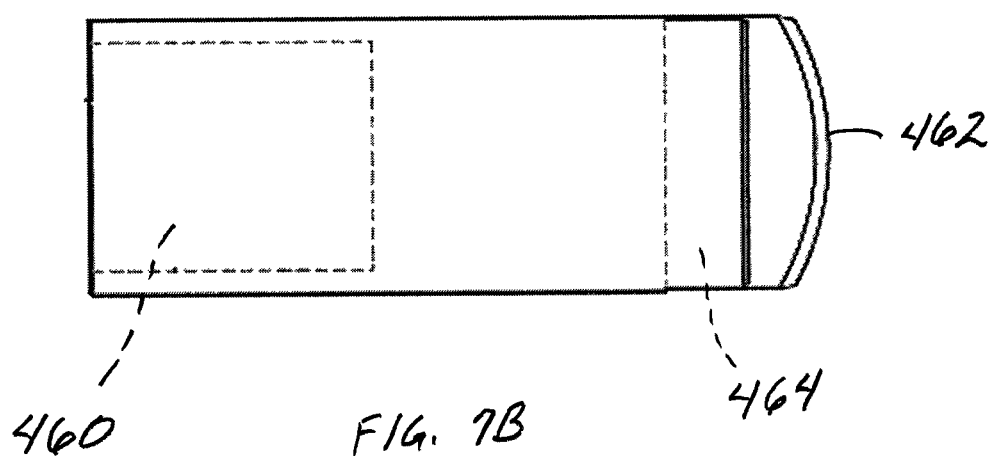
FIG. 7B is a top plan view of the piston of FIG. 7A.

Continuing to refer to FIG. 4, the main body 402 of the regulator assembly 400 includes an axial through-bore 450. First and second sleeve bearings 452, 454 are preferably press fit into the through-bore 450. First and second pistons 456, 458 are slidably received within the sleeve bearings 452, 454, respectively. Each piston 456, 458 includes an axial partial-bore 460 at one end. As best illustrated in FIG. 7, the other end of each piston 456, 458 includes an arcuate face 462 (FIG. 7B) and a notch 464. Seated within each partial-bore 460 of the first and second pistons are first and second piston springs 466, 468. The other end of each of the first and second springs 466, 468 abuts the diaphragms 422 of the first and second regulators 404, 406 respectively.

Continuing to refer to FIG. 4 in conjunction with FIGS. 8A-8E, a camshaft 470 extends transversely through and is rotatably supported by the main body 402. One end 476 of the camshaft 470 is preferably adapted for securing the lever 304 or other suitable user interface thereto. The other end of the camshaft 470 is preferably rotateably secured to the main body 402 by threading a nut 472 onto the threaded end of the camshaft 470. Washers 471, 473 are preferably disposed between the nut 472 and the exterior of the main body 402. At least one of the washers 471, 473 is preferably made of leather or other suitable material having a relatively high coefficient of friction such that when the nut 472 is sufficiently tightened against the washers, some frictional resistance against unwanted rotation of the lever 304 and camshaft 470 is achieved while still allowing the camshaft 470 to easily rotate. This frictional resistance allows the lever 304 to be moved to a desired position where it will remain in place until it is again grasped by the operator and moved to a new desired position.

The camshaft 470 further includes a stop plate 474 and first and second offset cams 480, 482. As best illustrated in FIG. 8E, each cam 480, 482 has a lobe 484 extending radially from the axis of the camshaft 470. The lobes 484 of each cam 480, 482 are preferably angularly offset from one another by an angle W, which, in the preferred embodiment, is 38.6 degrees. The camshaft 470 further includes a guide disk 486. As best illustrated in FIG. 4, the guide disk 486 is received within the notch 464 of the first and second pistons 456, 458, to keep the pistons from rotating within the through-bore 450 of the main body 402.

It should be appreciated that the first and second piston springs 466, 468 bias the first and second pistons 456, 458 axially inward toward the camshaft 470. As the operator rotates the camshaft 470 by moving the lever or other user interface 304 from side-to-side, the lobes 484 of the first and second offset cams 480, 482 respectively rotate against the arcuate contact surfaces 462 of the first and second pistons 456, 458 forcing the pistons to move in the direction toward the respective regulators. The stop plate 474 on the camshaft 470 is oriented with respect to the cams 480, 482 such that the first and second edges 486, 488 of the stop plate 474 abut the stop screw 490 before the cams rotate beyond the center axis of the first and second pistons 456, 458.

As previously described, in the preferred embodiment, the lever 304 is oriented in the vertical direction as shown in FIG. 2 when the camshaft 470 is in the neutral position. In the vertical neutral position, the cams 480, 482 do not displace the pistons 456, 458 and the pressure regulating valves 420 are closed such that no fluid flows through the first or second outlet ports 414-1 or 414-2, respectively and therefore the pressures in the down and lift circuits are substantially equal or constant. If the operator rotates the lever 304 clockwise as shown in FIG. 2A or to the left as viewed with respect to FIG. 4, the camshaft 470 to which the lever 304 is attached will likewise rotate clockwise causing the first cam 480 to rotate toward the first piston 456. As the lobe 484 of the first cam 480 comes into contact with the arcuate face 462 of the first piston 456, the first piston is forced axially leftward toward the first regulator 404. The pressure regulating valve 420 remains closed until the axial position of the first piston 456 compresses the piston spring 466 enough to create a force sufficient to overcome any opposing bias of the valve spring 432 and resistance of the diaphragm 422, at which point the diaphragm 422 will deflect to the left. When the diaphragm is deflected, the diaphragm stem 430 forces the valve plug 434 leftward, opening the axial passageways 433 (FIG. 5) through the valve body 424 thereby allowing pressurized air from the pressure source 600 to flow through the valve body 424, into the cavity 491 (FIG. 4) and out through the first regulator outlet port 414-1. Continued rotation of the lever 304 and camshaft 470 will cause the first piston 456 to continue to move axially to the left resulting in an increase in pressure in the down circuit as displayed on the "DOWN" visual indicator 310. When the pressure in the down circuit increases sufficiently such that the pressure in the cavity 491 on the backside of the diaphragm 422 overcomes the biasing force of the piston spring 466, the diaphragm 422 will return to its neutral or non-deflected state. The pressure in the down circuit will remain at this pressure until the lever 304 is moved further to the left or until the lever 304 is returned to the neutral position.

During planting operations, the operator will rotate the lever 304 to a desired down pressure position as indicated on the visual indicator 310 to achieve the desired aggressiveness of the row cleaner. If soil conditions change causing the row cleaner to pivot upwardly, the pressure in the down circuit will suddenly increase as the piston rod is forced inwardly. If the increase in pressure in the cavity 491 acting on the backside of the diaphragm 422 exceeds the bias of the piston spring 466, the diaphragm will deflect to the right. As the diaphragm 422 and diaphragm stem 430 move to the right, the passageways 433 through the valve body 424 will be opened as the diaphragm stem 430 lifts off the valve plug 436 thereby permitting air to bleed off by passing through the axial passageway 492 extending through the diaphragm stem 430 and diaphragm 422. The air will then pass into the through-bore 450 which is open to atmosphere by apertures 494 through the main body 402. The air will continue to bleed off until the pressure on the backside of the diaphragm 422 in the cavity 491 is less than the bias of the piston spring 466 such that the diaphragm returns to its neutral or non-deflected state. With the diaphragm 422 in the neutral or non-deflected state, the passageways 433 are again closed off as the valve plug 436 abuts the end of the diaphragm stem 430. The same action will occur if the operator rotates the lever 304 back to the center or neutral position from a down position.

Likewise if the soil conditions change causing the row cleaner to pivot downwardly, the pressure in the down circuit will suddenly decrease as the piston rod extends due to the loss of upward force exerted by the soil. If the pressure in the cavity 491 acting on the backside of the diaphragm 422 is less than the bias of the piston spring 466, the diaphragm will deflect to the left. As the diaphragm 422 and diaphragm stem 430 move to the left, the passageways 433 through the valve body 424 will be opened thereby allowing pressurized air from the pressure source 600 to flow through the valve body 424, into the cavity 491 and out through the first regulator outlet port 414-1. When the pressure in the down circuit increases sufficiently such that the pressure in the cavity 491 on the backside of the diaphragm 422 overcomes the biasing force of the piston spring 466, the diaphragm 422 will return to its neutral or non-deflected state.

Thus, it should be appreciated that the desired preset pressure in the down circuit as set by the position of lever 304 will be maintained by the pressure regulating valve opening and closing as necessary as soil elevations or other soil conditions change, thereby maintaining the desired amount of aggressiveness of the row cleaner with the soil.

It should be appreciated that because the second cam 482 is sufficiently offset from the first cam 480, the second regulator 406 remains closed and no fluid flows through the second regulator outlet port 414-2 throughout the full range of clockwise rotation of the lever 304 and leftward deflection of the first piston 456. As such, the pressure in the lift circuit remains substantially constant. It should also be appreciated that rotating the lever 304 counterclockwise as viewed in FIG. 2A or to the right as viewed in FIG. 4 will result in the same but opposite movement of the second piston 458 and corresponding movement of the components of the second regulator 406 to permit fluid flow through the second regulator outlet 414-2. Likewise, the first regulator 404 remains closed such that no fluid flows through the first regulator outlet port 414-1 throughout the full range of counterclockwise rotation of the lever 304 and rightward deflection of the second piston 456. As such, the pressure in the down circuit remains substantially constant. This relationship is graphically represented in FIG. 9 which illustrates that the pressures at the outlet ports 414-1 and 414-2 of the first and second regulators 404, 406 is a function of the angle of rotation of the lever 304 with respect to the neutral position, designated as 0 on the x-axis. Thus, when the lever 304 is rotated clockwise as viewed in FIG. 2A, the pressure at the outlet port 414-1 of the first regulator 404 increases proportionally until the maximum pressure is achieved when the lever is at +90 degrees, while the pressure at the outlet port 414-2 of the second regulator 406 remains at zero. Conversely, when the lever 304 is rotated counterclockwise as viewed in FIG. 2A, the pressure at the outlet port 414-2 of the second regulator 406 increases proportionally until the maximum pressure is achieved when the lever is at −90 degrees, while the pressure at the outlet port 414-1 of the first regulator 404 remains at zero.

It should be appreciated that with changes in the configuration and shape of the camshaft 470, the pressure characteristics illustrated in FIG. 9 may be varied. For example, the curves may be shifted apart such that both pressures are zero for lever positions within, e.g., 5 degrees of the neutral position. Similarly, the curves may be shifted together such that neither pressure is zero at the same time. The range of rotation required to obtain maximum pressure at each outlet port 414 may also be varied, and may be substantially symmetrical (as illustrated in FIG. 9) or may be asymmetrical such that a lesser range of rotation is required to obtain full pressure at, e.g., outlet port 414-1 than 414-2.

In all orientations of the lever 304, the visual indicators 306, 308, 310 are configured to display the pressure at the pressure supply 600, in the down circuit at the first regulator outlet 414-1, and in the lift circuit at the second regulator outlet 414-2 respectively. And, as displayed in FIG. 2, it is preferred that the controller 300 is oriented such that when the operator turns or rotates the user interface 304 clockwise, the pressure in the down circuit increases. Likewise, when the operator turns or rotates the user interface 304 counterclockwise, the pressure in the lift circuit increases. In this manner, the control system 100 is intuitive to the operator.

Figure 10:
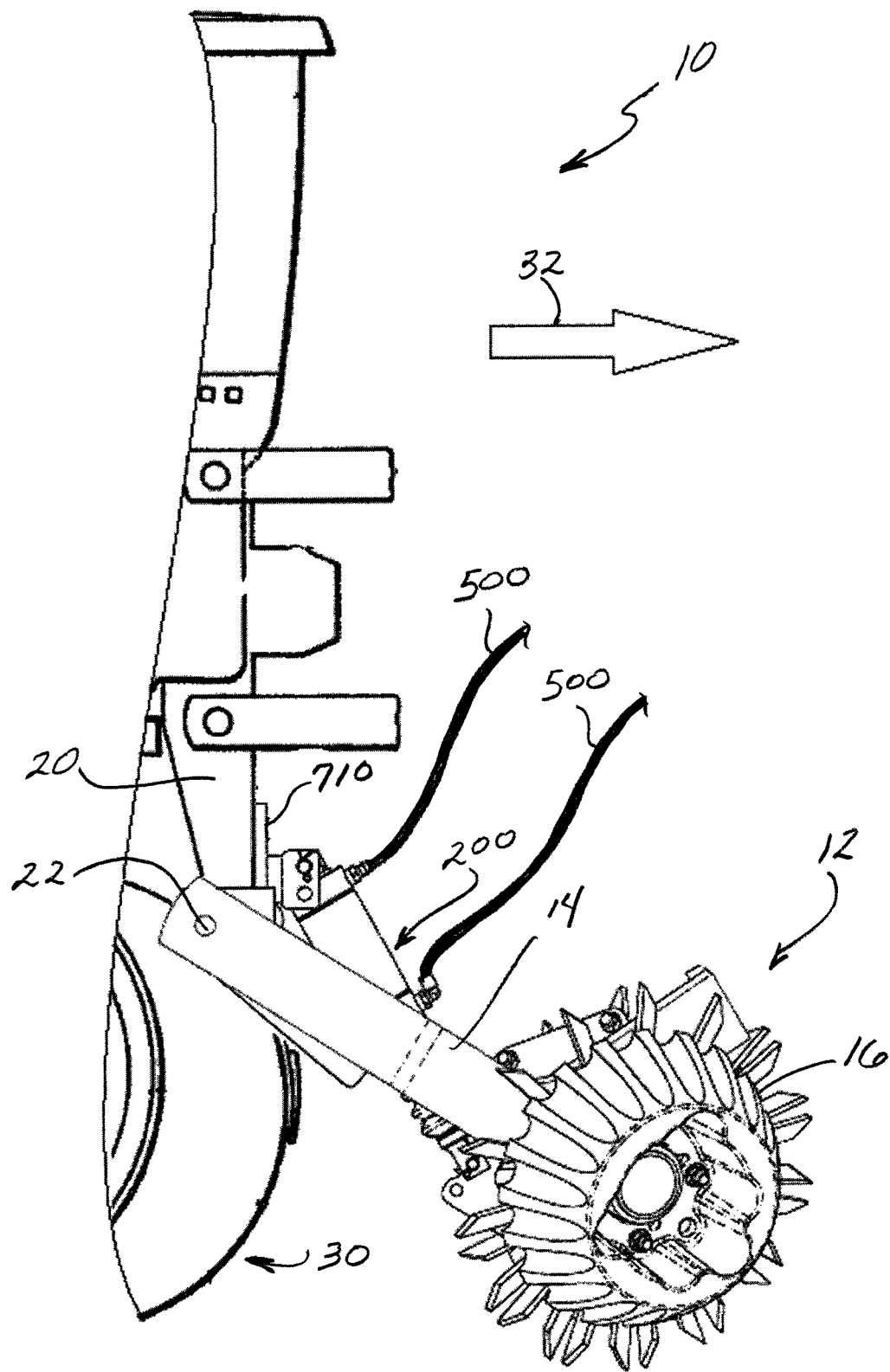
FIG. 10 is a partial side elevation view of a row unit of an agricultural planter showing a row cleaner incorporating the control system of FIG. 1.
Figure 11:
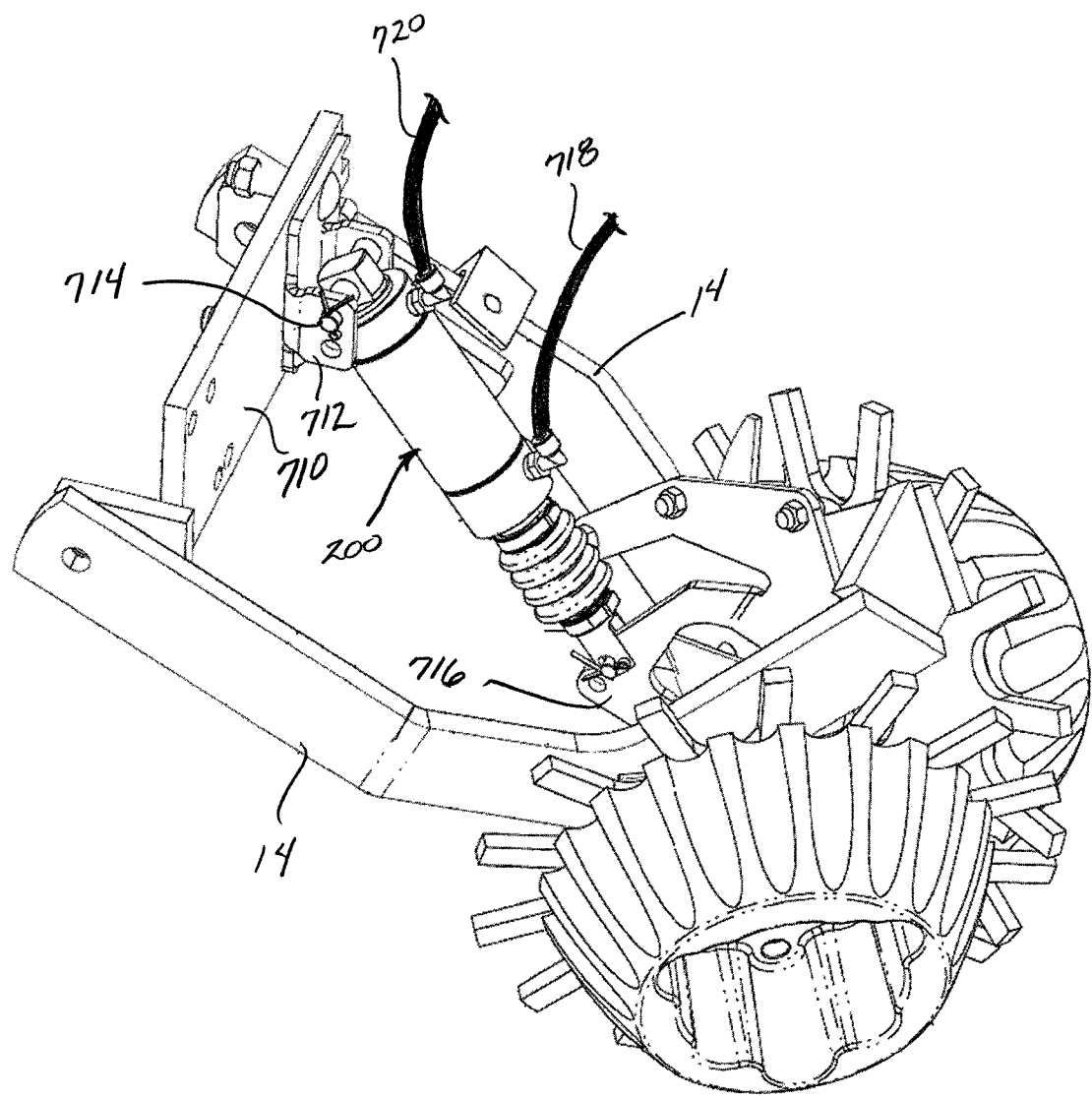
FIG. 11 is a perspective view of the row cleaner of FIG. 10 incorporating the control system of FIG. 1.

Referring now to FIGS. 10 and 11, the control system 100 is illustrated in connection with a row cleaner 12 attached to a row unit 10 of an agricultural planter. Row units 10 such as described in U.S. Patent No. 4,009,668, incorporated herein in its entirety by reference, are well known in the art. Similarly, row cleaners 12 such as disclosed in U.S. Pat. No. 7,673,570 previously incorporated herein by reference, are well known in the art. The row cleaner 12 includes forwardly extending pivotal arms 14 to which ground engaging row cleaner wheels 16 are rotatably secured. The rearward ends of the row cleaner arms 14 are mounted to the row unit shank 20 by pins 22 forwardly of the furrow opening assembly 30 such that the arms 14 are free to pivot upwardly and downwardly relative to the soil surface. The row cleaner wheels 16 engage the soil surface and as the planter is drawn forwardly through the field as indicated by arrow 32, the row cleaner wheels 16 rotate. As the wheels 16 rotate through the soil, their angled orientation with respect to the forward direction of the planter throws the debris to either side leaving a strip of soil substantially clear of debris in front of the furrow opening assembly 30.

A bracket 710 is mounted to the row unit shank 20 by bolts or other suitable fastening means. The bracket 710 includes forwardly projecting ears 712. A pin 714 pivotally secures one end of the actuator 200 to the ears 712. The other end of the actuator 200 is pivotally secured to a plate 716 mounted to the forwardly extending row cleaner arms 14. Air hoses or conduits 500 fluidly connect the actuator 200 to the controller 300 and to the respective first and second regulator outlet ports 414-1, 414-2 as previously described. The controller 300 (not shown in FIGS. 10 and 11) is preferably mounted within the cab of the tractor for controlling and viewing by the operator. The pressure source 600 (not shown in FIGS. 10 and 11) is preferably mounted to the planter frame. A preferred pressure source 600 suitable for controlling row cleaners on a planter as hereinafter described is a 2 gallon, 12 volt air compressor, such as the air compressor available from VIAIR, model no. 350c, in Irvine Calif.

It should be appreciated that the mass of the row cleaner 12 alone will impose a downward force on the soil surface as the planter traverses the field. However, by incorporating the control system 100 as described above, the operator is able to increase the downward force by rotating the lever 304 counterclockwise in the direction of the visual indicator 310 preferably labeled "DOWN" as shown in FIG. 2A. As previously described, rotating the lever 304 will result in an increase in the fluid pressure in the down circuit forcing the actuator rod 202 (FIG. 6) to extend forcing the row cleaner to pivot downwardly into further engagement with the soil causing more aggressive action of the row cleaner wheels 16. Likewise, to lift the row cleaners 12 so that the row cleaner wheels 16 are raised above the soil surface (for example when turning the planter at the headlands) or when less aggressive action of the row cleaner wheels is desired (for example when debris is light or other changes in soil conditions) the operator may rotate the lever 304 clockwise in the direction of the visual indicator 308 preferably labeled "LIFT" as shown in FIG. 2A. To fully lift the row cleaner 12 so that the row cleaner wheels 16 are raised above the soil surface, the lever 304 is turned clockwise far enough to the "LIFT" side to provide sufficient pressure in the lift circuit such that the actuator rod 202 (FIG. 6) retracts far enough to rotate the row unit arms 14 about the pin 22 until the row cleaner wheels 16 are above the soil surface.

As illustrated in FIG. 1, the controller 300 may control multiple actuators 200 and thus multiple row cleaners 12. Alternatively, multiple controllers 300 may be employed to control individual actuators and row units or groups of actuators and row units.

In addition, it should be appreciated that other implementations may be made of the control system 100 as described herein. For example, the control system 100 may be used to vary the downforce on other ground engaging components of a planter, such as a row unit downforce system as disclosed in U.S. Pat. No. 6,389,999 or Applicant's co-pending application Ser. No. 12/679,710 (Pub. No. 2010/0198529), both of which are incorporated herein in their entireties by reference, to vary the downforce imposed on a row unit of the planter by an actuator such as cylinders or air bags. The control system 100 may be adapted to provide variable pressure to the down and lift circuits associated with such downforce actuators, enabling a user to control the downforce on the row unit. As discussed above with respect to the row cleaners 12, the control device may be adapted to simultaneously control the downforce on all of the row units. Alternatively, multiple control devices may be adapted to control sections or individual row units of the planter.

Similarly, in a planter such as that disclosed in U.S. Pat. No. 4,009,668, previously incorporated by reference above, the downforce on the closing wheels of the row unit are typically varied by an actuator such as a spring (indicated by reference numeral 59 in the '668 patent). In one implementation, the actuator associated with each closing unit may be the actuator 200. The pressures associated with the actuator 200 may be controlled by the control system 100 as disclosed herein. Thus, the user is able to vary the downforce on the closing wheels of the row unit from the cab. As discussed above with respect to the downforce actuator, such a system may be adapted to control all of the closing wheels across the entire planter or individual closing wheels or groups of closing wheels.

Those skilled in the art will also appreciate that various configurations of the camshaft 470 and the lobes 484 and the orientations of the cams 480, 482 may be suitable. Additionally, rather than cams, the camshaft 470 may utilize a worm gear or other suitable cooperating arrangements to convert rotation of the camshaft into linear or axial movement of the pistons.

Moreover, in other embodiments, the cams 480, 482 may be modified such that a constant force is applied to one of the piston springs 466, 468 while the force on the other piston spring is varied. In such embodiments, as the user varies the pressure at one circuit output, the pressure at the other circuit output remains at a constant non-zero value.

In still other embodiments, the cams 480, 482 may be modified such that a varying force is applied to one piston spring 466, 468 while the force on the other piston spring is varied. For example, the cams 480, 482 could be configured such that as the user moves the lever 304 from a first orientation to a second orientation, the pressure in the first circuit steadily increases and the pressure in the second circuit steadily decreases.

Moreover, further embodiments of the regulator assembly 400 may be made to control the fluid pressures in more than two circuits. For example, a second main body 402 may be provided with a second set of pistons may be provided with a longer camshaft 470 incorporating a second set of cams extending through both main bodies. Thus, as the operator turns the lever 304, multiple regulators may be opened or closed to control fluid flow through multiple circuits.

Figure 12:
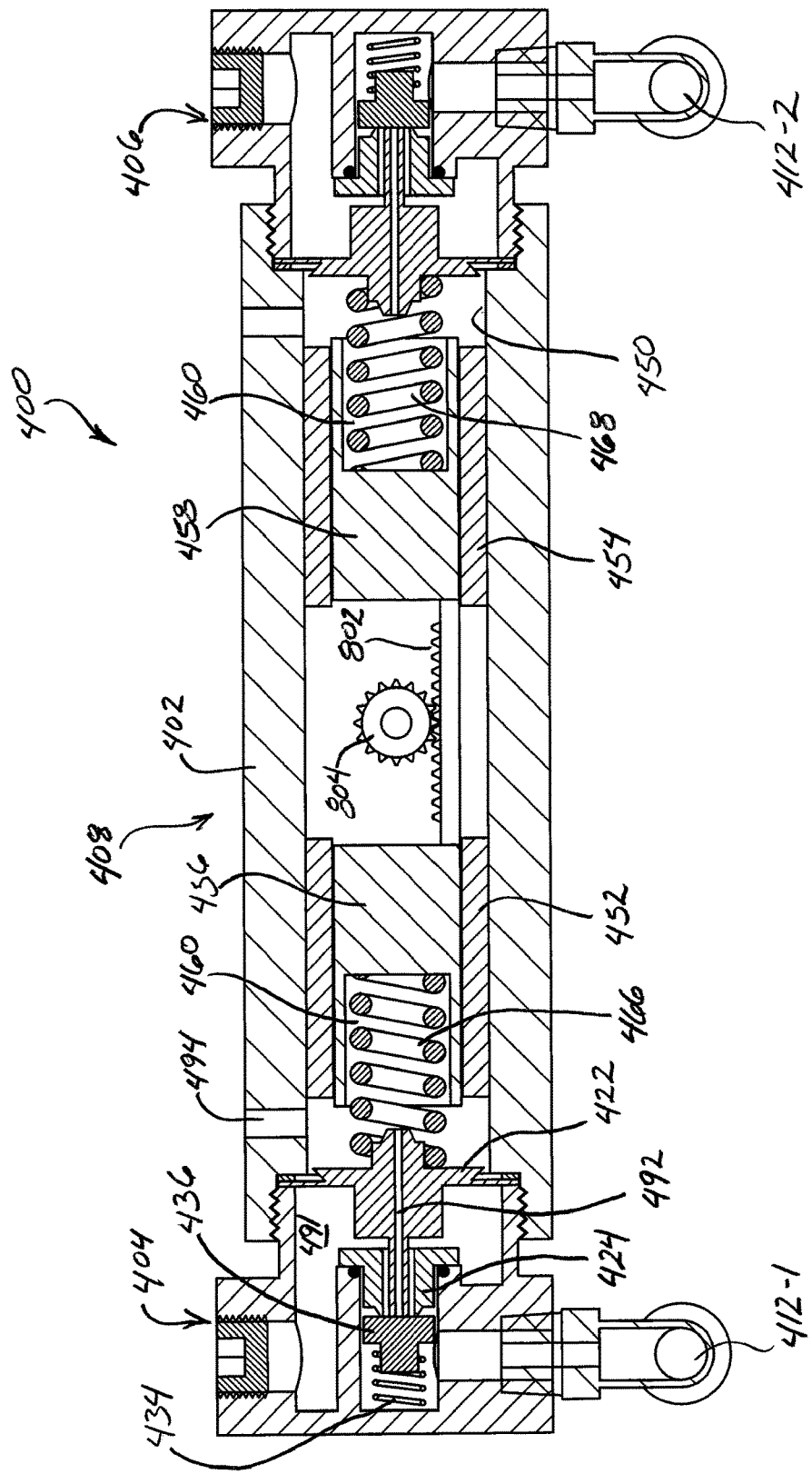
FIG. 12 illustrates an alternative embodiment of a regulator biasing mechanism for the controller.

In still other embodiments, the controller 400 may be modified to provide an alternative regulator biasing mechanism 408 such that camshaft 470 is replaced with other devices configured to alternately displace the pistons 456, 458 upon rotation of the lever 304. For example, as illustrated in FIG. 12 the regulator biasing mechanism 408 may comprise a rack and pinion arrangement. In this embodiment, the rack 802 is slidably mounted within the main body 402 such that it is constrained to rotate in a leftward or rightward direction from the perspective shown in FIG. 12. The pinion 804 is mounted to the lever 304 such that when the operator turns the lever 304 the rack 802 contacts one of the pistons 456, 458. The dimensions and gearing of the rack and pinion are preferably such that a user can move one of the pistons 456, 458 through the desired range of motion, thus providing the desired range of pressures at the associated outlet ports 414-1, 414-2 of the first and second regulators 404, 406, respectively, while the other piston remains unmoved.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A row cleaner downforce control system, comprising:
   a planter row unit including a furrow opening assembly configured to open a furrow in a soil surface when moving along a forward direction of travel;
   a row cleaner pivotally mounted to said planter row unit forward of said furrow opening assembly with respect to said forward direction of travel, said row cleaner having a frame and at least one wheel, said at least one wheel disposed to rollingly contact said soil surface when traveling along said forward direction of travel, said at least one wheel angled with respect to said forward direction of travel such that said at least one wheel throws debris on said soil surface to a side of said forward direction of travel;
   a dual acting actuator operably coupled to said row cleaner and a pressure source, said dual acting actuator having a down chamber and a lift chamber; and
   a controller in communication with said pressure source, said lift chamber and said down chamber and operable to control a down pressure in said down chamber and a lift pressure in said lift chamber from said pressure source;
   whereby increasing said down pressure in said down chamber increases a downforce applied by said at least one wheel on said soil surface, and whereby increasing said lift pressure in said lift chamber decreases said downforce applied by said at least one wheel on said soil surface.

2. The row cleaner downforce control system of claim 1, wherein said at least one wheel comprises a first wheel and a second wheel.

3. The row cleaner downforce control system of claim 1, wherein said controller comprises a pressure regulating valve that selectively maintains said down pressure in said down chamber at any of a continuous range of pressures.

4. The row cleaner downforce control system of claim 1, wherein said controller is configured to selectively maintain said lift pressure in said lift chamber.

5. The row cleaner downforce control system of claim 1, further comprising:
a user interface configured to modify an operating state of said controller, whereby when a user modifies a position of said user interface, one of said down pressure and said lift pressure is modified so as to modify said downforce.

6. The row cleaner downforce control system of claim 5, wherein said user interface is configured to move through a continuous range of motion.

7. The row cleaner downforce control system of claim 6, wherein said range of motion includes a lift range and a down range, wherein said lift pressure varies according to said position of said user interface within said lift range, and wherein said down pressure varies proportionally with said position of said user interface within said down range.

8. The row cleaner downforce control system of claim 7, wherein said range of motion includes a neutral position, wherein said neutral position is disposed between said lift range and said down range, and wherein said lift pressure and said down pressure are equal when said user interface is in said neutral position.

9. The row unit downforce control system of claim 1, wherein said controller comprises a lift regulator and a down regulator, wherein said lift regulator is in fluid communication with said lift chamber and wherein said down regulator is in fluid communication with said down chamber.

10. The row unit downforce control system of claim 9, wherein said user interface is configured to move through a continuous range of motion.

11. The row unit downforce control system of claim 10, wherein said range of motion includes a lift range and a down range, wherein a lift outlet pressure of said lift regulator varies according to said position of said user interface within said lift range, and wherein a down outlet pressure of said down regulator varies proportionally with said position of said user interface within said down range.

12. The row unit downforce control system of claim 11, wherein said range of motion includes a neutral position, wherein said neutral position is disposed between said lift range and said down range, and wherein said lift pressure and said down pressure are equal when said user interface is in said neutral position.

13. The row unit downforce control system of claim 1, wherein said controller is configured to selectively maintain said lift pressure at one of a first range of pressures, and wherein said controller is configured to selectively maintain said down pressure at one of a second range of pressures.

14. The row cleaner downforce control system of claim 13, wherein said controller comprises a pressure regulating valve that selectively maintains said down pressure in said down chamber at any of a continuous range of pressures.

* * * * *